United States Patent

[11] 3,592,528

| [72] | Inventor | Zoltan J. Kiss |
| | | Belle Mead, N.J. |
| [21] | Appl. No. | 716,032 |
| [22] | Filed | Mar. 26, 1968 |
| [45] | Patented | July 13, 1971 |
| [73] | Assignee | RCA Corporation |

[54] PHOTOCHROMIC DISPLAY DEVICE
4 Claims, 8 Drawing Figs.

[52] U.S. Cl.................................................. 350/160, 252/300
[51] Int. Cl................................................... G03c 1/00
[50] Field of Search.................................. 350/160, 161; 252/300

[56] References Cited
UNITED STATES PATENTS

| 3,253,497 | 5/1966 | Dreyer........................ | 350/160 |
| 3,296,594 | 1/1967 | Van Heerden............... | 350/3.5 |
| 3,454,414 | 7/1969 | Andes et al.................. | 350/169 P |
| 3,387,140 | 6/1968 | Roth et al.................... | 350/169 P |

Primary Examiner—William L. Sikes
Attorney—Glenn H. Bruestle

ABSTRACT: A photochromic information display and storage device comprises a photochromic target having two absorption states, one of which includes a nondestructive readout band. The target comprises, for example, cerium or lanthanum-doped calcium fluoride crystals. The device also includes means for switching the target from one absorption state to the other and means for directing light in the nondestructive readout band onto the target for the purpose of reading the information stored thereon. The device may also include means for detecting that portion of the light in the nondestructive readout band which is not absorbed by the target and/or means for switching the absorption state of the target back to its original state.

Fig. 4.
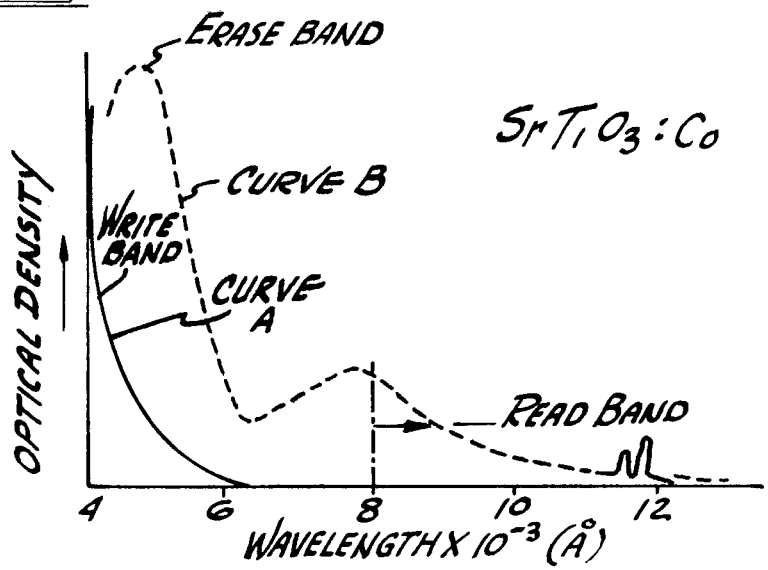
Fig. 5.
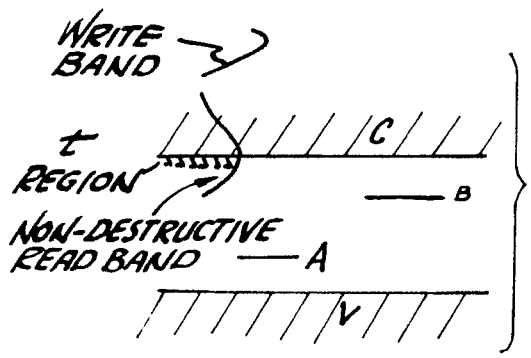
Fig. 6.
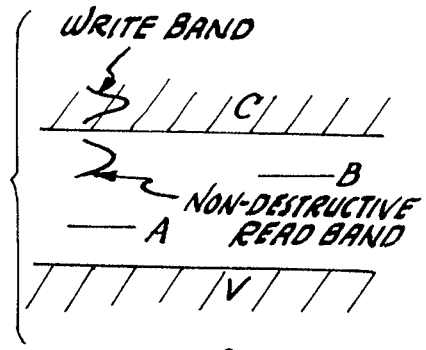
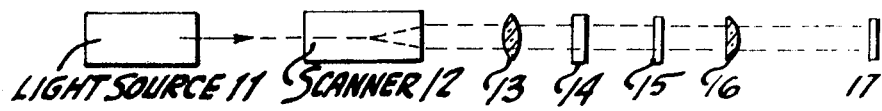
Fig. 7.
Fig. 8.
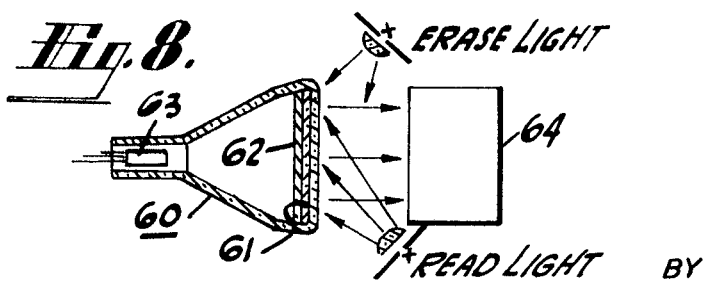
INVENTOR
ZOLTAN J. KISS

PHOTOCHROMIC DISPLAY DEVICE

BACKGROUND OF THE INVENTION

Information display or storage devices utilizing photochromic materials in which data may be written onto a screen and erased therefrom by light of appropriate wavelengths are known in the art. An example of a photochromic device of this nature is disclosed in U.S. Pat. No. 3,134,297, issued to C. O. Carlson, et al. In these prior art devices, the light used to erase the image is of the same wavelength as that used to read the image. Therefore, the intensity of the reading light must be low enough so as not to substantially erase the image if storage is desired. Also, the longer or more frequently the read light is projected onto the target, the greater the amount of erasure that occurs. Hence these prior art devices are not preferred for applications where long term storage is desired, especially where the information or image is to be read many times or for sustained periods. A computer application is just one of such applications. It is therefore desirable to have a device which possesses a nondestructive readout capability.

SUMMARY OF THE INVENTION

A photochromic information display and storage device comprises a photochromic target characterized in that it has two absorption states; one state includes a nondestructive readout band. The device includes means for nondestructively reading out information stored on said target.

BRIEF DESCRIPTION OF THE DRAWINGS

FIGS. 2—4 are graphical representations of the absorption characteristics of several specific materials useful as target elements for the novel device.

FIGS. 5 and 6 are energy level diagrams of $SrTiO_3$ and $CaF_2$, respectively.

FIG. 7 is an elevation view of an embodiment of the novel device in which a laser is utilized for writing an image.

FIG. 8 is a view partly in section and partly schematic of an embodiment of the novel device in which an electron beam is utilized for writing an image.

DETAILED DESCRIPTION OF THE PREFERRED EMBODIMENTS

The novel device disclosed herein relates to a data display device utilizing a photochromic screen onto which data or an image may be written, read or viewed by light of a first wavelength which does not tend to erase the image, and erased therefrom by light of an appropriate second wavelength in a wavelength band other than that used for reading the image. The present device provides an improvement over the prior art devices by providing a screen having a nondestructive readout.

Figure 1:
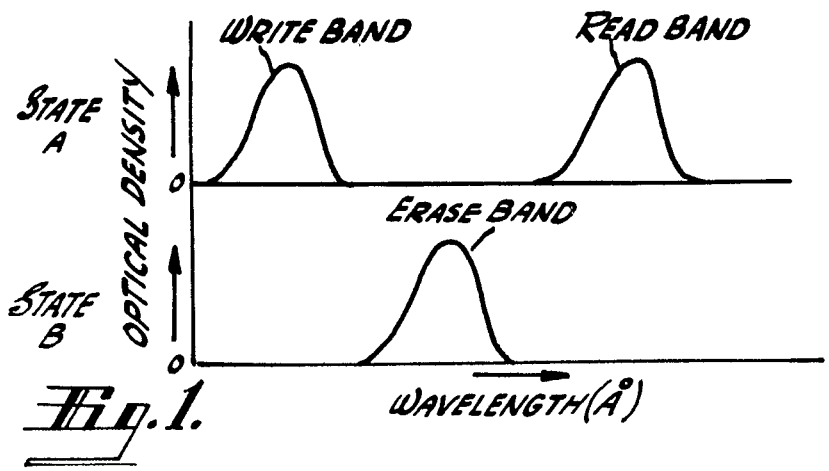
FIG. 1 is an idealized graphic representation of an absorption characteristic of a photochromic target useful in the novel device.

FIG. 1 shows an idealized absorption spectrum of a photochromic material useful as a target in the novel device. In FIG. 1, there is indicated two states of absorption arbitrarily denoted as state A and state B, between which the photochromic material can be switched. When in state A, the material has two individual and separated photon absorption bands, hereinafter termed the write band and the read band. State B has one absorption band, hereinafter termed the erase band. The absorption band of state B, as shown for the purpose of this illustration, is in the wavelength region between the two absorption bands of state A. When light in the write band or when an electron beam impinges upon the photochromic target, energy is absorbed and there is a conversion in the absorption spectrum of the target from state A toward state B. That is, the absorption bands of state A decrease in absorptability or optical density while the absorption band of state B increases in absorptability or optical density. This change can be continued until the write and read bands disappear. The term optical density is related to transmission of energy by the relation $0.0 = \ln 1/T$ where 0.0 is optical density and $T$ is the fraction of light transmitted by a material at constant reflectivity. The greater the optical density the less the transmission and the greater the absorption of a material. When light in the read band of state A impinges upon the photochromic target, there is no change in the optical density of any of the absorption bands and a portion of the read light is absorbed in proportion to the amplitude or optical density of the read band, thus providing a nondestructive readout. When light in the erase band impinges on the photochromic target, the target reverts back toward its original state A wherein both the write and read bands increase in optical density while that of the erase band decreases and finally disappears.

A negative image (relatively speaking) can be formed on the target by merely interchanging the function of the write and erase bands. This can be done since the absorption characteristic can be switched back and forth between these bands. Where the initial state of the target is that of state B such that the photon absorption bands of state A are absent, light in the absorption band of state B can be used to form or write an image while light in the band of state A which causes switching of the target from state A to state B can be used to erase the image so formed.

Figure 2:
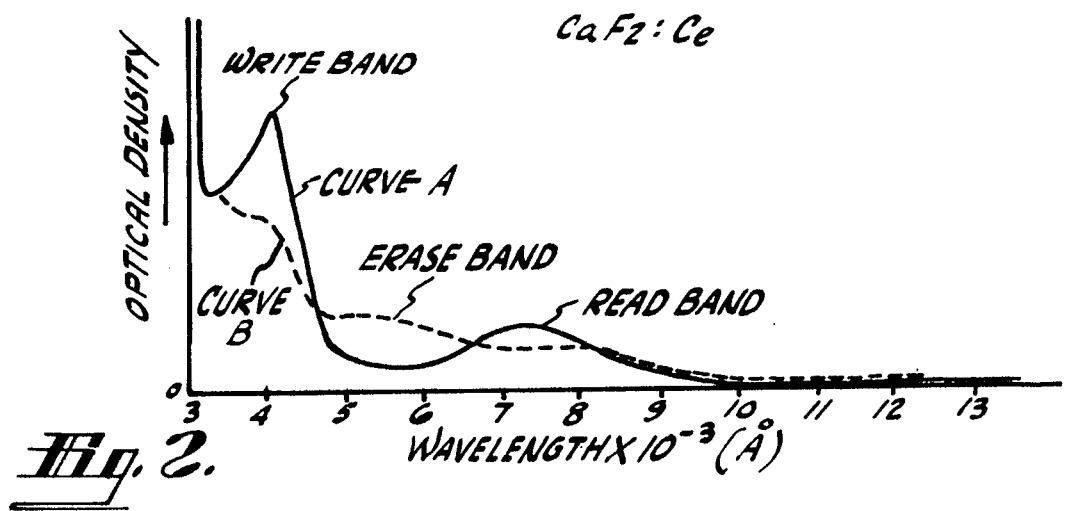
Figure 3:
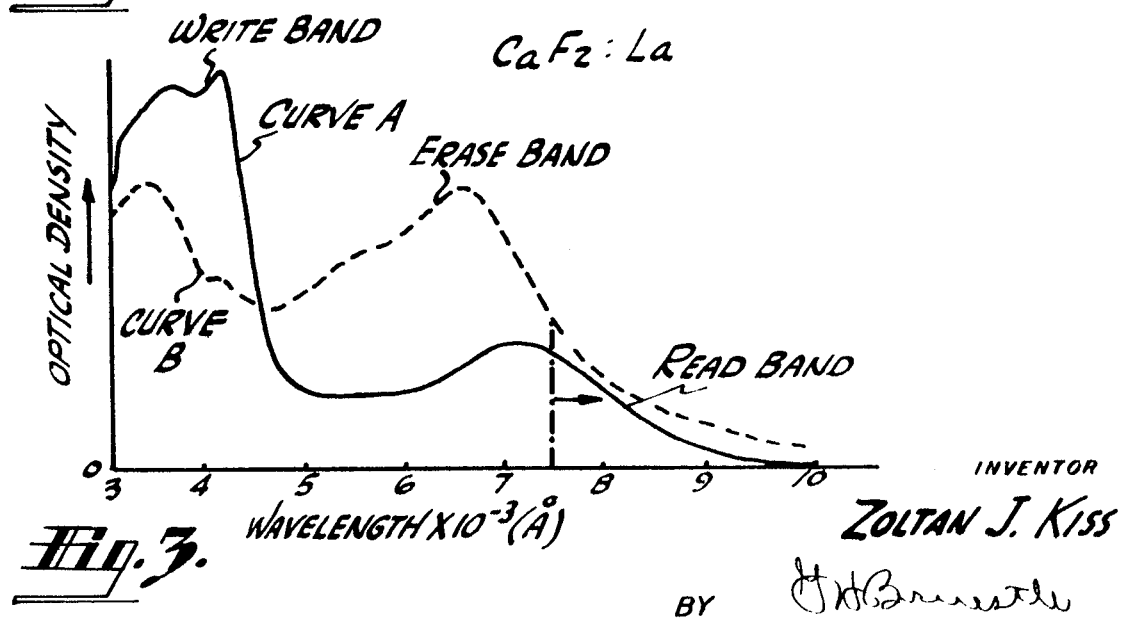

In FIGS. 2 to 4, the absorption states of several photochromic materials are shown. The particular photochromics shown are calcium fluoride doped with cerium (FIG. 2), calcium fluoride doped with lanthanum (FIG. 3), and strontium titanate doped with cobalt (FIG. 4). Another useful material is barium bromofluoride (BaBrFiBa) doped with barium. In order to optimize the nondestructive readout characteristics of the photochromic doped alkaline earth fluoride materials disclosed herein, these materials are either bombarded with gamma irradiation or baked in a reducing atmosphere at elevated temperatures. Generally, when rare earths are incorporated into $CaF_2$, or other alkaline earth halides, they enter in the trivalent state replacing a portion of the calcium ion. Upon exposure of the $CaF_2$ containing the trivalent rare earths to gamma irradiation or preferably to a Ca vapor atmosphere, the rare earth ions are reduced to a divalent state. The extra electron taken on by most rare earth ions enters the $4f$ configuration. However, in La and Ce, the electron enters the $5d$ configuration. The electronic wave functions of these $5d$ ground states overlap the surrounding atoms more than the $4f$ functions do and give rise to the desired photochromic characteristics.

It has been found that $CaF_2$ doped with the aforementioned rare earths and treated in a Ca metal vapor exhibit essentially no fatigue after having been cycled more than $10^6$ times. These materials have transition rates of faster than 1 microsecond. $CaF_2$:Ce treated in this way has a room temperature thermal stability of about one month. The thermal stability is increased manyfold by keeping the material at reduced temperatures. An example of the ion-reducing procedures follows.

EXAMPLE 1

Calcium fluoride single crystals containing from about 0.05 to 0.3 mole percent lanthanum or cerium are grown by conventional techniques, such as the gradient freeze method. One to 2 millimeter samples are cleaved from the boules and placed in a 1 Mev. gamma irradiation source for a total dosage of $16^6$ roentgens. The samples which were then removed from the radiation source were visibly colored.

EXAMPLE 2

The $CaF_2$ samples to be colored are prepared as described in example 1. These samples are then baked at a temperature of about 700° C. in a sealed tube containing metallic calcium for about 1—2 hours.

In each of the FIGS. 2 to 4, curve A refers to the initial or original absorption state of the photochromic material and curve B refers to the absorption state resulting after irradiation with light in the write band of the material in question. As pointed out in the discussion of the idealized curves, the degree of change from one absorption state to the other is dependent upon the intensity and time of irradiation of the light used. Also, the maximum optical densities obtainable in the induced absorption state depends upon the density of color centers in the photochromic screen. The color centers are produced by the particular dopants in the crystal.

FIG. 2 gives the absorption states of crystalline $CaF_2$:Ce which has been baked in a calcium vapor atmosphere. Curve A of this figure indicates that this material has two absorption bands in its initial state. The first absorption band, which is between about 3,100 and 4,200 A., is termed the write band. The second absorption band of curve A, which occurs between about 6,500 and 8,000 A., is termed the read band. Light within the write band causes the photochromic calcium fluoride to change its absorption state by reducing the optical density of the write band and of the read band and by increasing the optical density in a new band which appears between about 5,000 and 6,000 A. This new band, which can be seen with reference to curve B of FIG. 2, is termed the erase band. The amount of change in the absorption characteristics of the photochromic calcium fluoride from the original state, as shown in curve A, to the second state, as shown in curve B, depends upon the intensity and time that the crystal is irradiated with light in the write band. Hence, the degree of change of the optical density of the read band can be controlled so as to form an image having a gray scale. The image so formed can be read by irradiating the photochromic crystal with either light within the read band or with light of longer wavelengths. Light of these wavelengths do not cause any change in the absorption characteristics of the crystal and hence provide a nondestructive readout of the previously written image. In order to erase the image and cause the crystal to return to its original state, the crystal is irradiated with light in the erase band.

Both writing and erasing can be done on selected areas of the target. Likewise, if one desires, only selected portions of the crystal need be read at any given time. Since in this $CaF_2$:Ce system the reading light is in the infrared portion of the spectrum, it is necessary to use an image converter in combination with the novel device if a visible image is desired. Such image converters are well known in the art. In computer applications, an image converter is probably not necessary and one may utilize an infrared detector to feed the information recorded on the crystal to the computer.

In FIG. 3, the absorption characteristics of a $CaF_2$:La crystal in both its original state (Curve A) and its infrared absorption state, produced after irradiation with light of about 3,500 A., (Curve B) is shown. The states of this crystal are very similar to the absorption states of the $CaF_2$:Ce crystal shown in FIG. 2. The difference between these two crystals is that the erase band of the photon induced state and the read band of the original state overlap to a considerable extent. Due to this overlap, it is only practical to read the information stored in the crystal with light of wavelengths greater than 7,500 A. and preferably with light greater than 9,000 A. so that no erasure tends to occur while reading and that a truly nondestructive readout can be maintained.

In FIG. 4, the absorption characteristics of $SrTiO_3$:Co is shown. This material differs in its photochromic absorption characteristics as compared to the aforementioned calcium fluoride crystals in that in its original state, as shown in curve A of FIG. 4, there is only one absorption band, this band peaking at about 4,000 A. Wavelengths of about 4,000 A. or less are used for writing images onto the crystal. When the crystal is irradiated at such wavelengths, the absorption characteristics change toward that shown in curve B of FIG. 4. This curve has two broad absorption bands. The first, which is the erase band, occurs between about 4,200 and 5,700 A. The second absorption band, which may be called the read band, is between about 7,200 and 9,000 A. However, it is believed that due to the location of this band with reference to the conduction band of strontium titanate, the actual read band for nondestructive readout is at wavelengths of greater than 8,000 A., including wavelengths of up to, for example, 12,000 A. This condition is further explained with reference to FIG. 7.

FIG. 5 represents the energy level diagram of strontium titanate doped with an impurity ion. The energy level diagram is shown to have a valence band V, a conduction band C, and a forbidden gap therebetween. The impurity ion has a ground state energy level A, which lies in the forbidden gap. This impurity ion, which in the present material is cobalt, is responsible for imparting the photochromic coloring of the strontium titanate. Color is produced when an electron associated with the cobalt ion is raised from its ground state to an excited state within the conduction band of the host $SrTiO_3$ crystal and then migrates through the conduction band, thereby leaving the cobalt ion, and falls into or is trapped at another site within the forbidden gap of the host crystal. This site, represented by B in the figure, may be due to either a second impurity ion or a crystal imperfection. Erasure of the color is due to a reverse process. That is, by raising the electron from the B trap site to the conduction band and back to the ground state A of the impurity ion. In order to obtain nondestructive readout, there must be an absorption band present whose optical density is changed by writing light and whose energy state is below the conduction band of the host crystal so that an electron excited to the level from the ground state will return to the ground state and will not be free to migrate through the host crystal. There is a relatively small region which lies just below the conduction band but is so close to that band such that thermal energy, due to the absorption of read light or to changes in room temperature, may raise the electron into the conduction band. This region, shown as, $t$, in FIG. 5, is therefore also not suitable for true nondestructive readout.

The absorption band in $SrTiO_3$:Co which would normally be considered the read band is shown in FIG. 5 above state A to overlap the conduction band. Based on the reasoning given above, that portion of the band lying above and immediately below the conduction band is not suitable for nondestructive readout and only those wavelengths within the forbidden gap, namely wavelengths above 8,000 A., are so suitable.

This can be compared to the energy level diagram of $CaF_2$:Ce shown in FIG. 6 wherein the read band is substantially entirely within the forbidden gap of the host crystal.

The same requirements for displaying a visual image without erasing the image is present in the strontium titanate as described for the cerium doped and lanthanum doped calcium fluoride. That is, an image converter is necessary. Also, in this crystal, the erase band and the write band overlap to some extent and for greatest efficiency of erasure, light in the wavelength range from about 5,300 to about 6,000 A. is preferred for erasure.

A display device incorporating a target comprised of photochromic materials having the properties as described above is illustrated schematically in FIG. 7.

In FIG. 7, the device is comprised of a source of light 11 to write an image on the target. The light source 11 shown in this figure also acts as the light source for reading and erasing. An example of such a source is a tunable argon laser which can be made to emit light having wavelengths of either about 1.2 microns, 0.47 microns or 0.57 microns. The light emitted from the laser source passes through a beam scanning device 12 such as a mechanical or electro optical scanner as is known in the art. The scanned light passes through a focusing lens 13 which focuses the light on a photochromic target 14 as it scans the target in the form of a raster. In the device as shown, the light is then made to pass through a filter 15 and from the filter through a projecting lens 16 onto either a projection screen or a detector 17. The purpose of the filter 15, which is optional, is to pass only light in the read band onto the screen or detector 17.

In operation, an image is formed on the photochromic target 14 by controlling the writing light with the scanner 12 in a manner so as to form a selected pattern on the target 14. At a point in time at which it is desired to read the image previously recorded on the target 14, the laser source 11 is tuned to emit light of the read wavelength of the target material so that read light is passed through the scanner 12 and onto the target 14. A portion of this read light is absorbed in the area in which the target 14 has been darkened by the write light. The remainder of the read light is passed through the filter 15 and the projecting lens 16 and onto the detector 17. If one desires to erase either the whole or any part of the previously recorded image, the laser source 11 is then tuned to a wavelength in the erase band of the target 14, and by proper modulation of the scanner, selected areas of the target can be erased. Alternatively, one can create a complete raster and scan the whole target, completely erasing the previously recorded image.

In the above mode of operation, light is transmitted through the photochromic target 14 onto a screen or detector. Alternatively the photochromic target 14 may have a reflective back coating and reflected light may be used to display or record the image on the photochromic target.

The light source for reading, writing and erasing need not be a tunable laser as described above. For example, it can be three individual light sources, such as three lasers or three high intensity lamps such as of the Osrom type. The only requirement of the light sources is that they emit light in the desired wavelength regions and preferably are of high intensity and of narrow bandwidth. However, if the bandwidth is broader than desirable, filter means may be employed.

An alternate means for writing an image onto the photochromic targets disclosed herein is by means of electron beam bombardment of the target. FIG. 8 shows a cathode-ray tube 60 comprised of a dark trace photochromic screen 61 consisting of a layer of the photochromic materials as disclosed herein. The screen may also comprise a second layer consisting of a reflective material 62 adjacent to the photochromic layer 61. In this device, an image can be written on the photochromic screen 61 by means of a signal applied to an electron gun 63 within the cathode-ray tube structure. The electron gun 63 produces an electron beam which is made to scan the photochromic screen 61 in accordance with an input signal as is well known in the television art. The image is then read by shining light in the read band onto the face of the screen as shown, and detecting a portion of the light which is reflected from the screen by an infrared detector or an image converter 64. This is but one example of the use, in a cathode-ray tube, of a photochromic screen having a nondestructive readout. Other cathode-ray tube structures as are known in the art may be used in conjunction with a nondestructive readout photochromic screen.

What I claim is:

1. A photochromic display and storage device having a photochromic target comprising a material selected from the group consisting of $CaF_2$:La, $CaF_2$:Ce, and $SrTiO_3$:Co.

2. The device described in claim 1 wherein the photochromic target comprises $CaF_2$:La.

3. The device described in claim 1 wherein the photochromic target comprises $CaF_2$:Ce.

4. The device described in claim 1 wherein the photochromic target comprises $SrTiO_3$:Co.